(12) United States Patent
Takatsuka et al.

(10) Patent No.: US 6,421,106 B1
(45) Date of Patent: Jul. 16, 2002

(54) REFLECTOR HAVING PITS AND PROJECTIONS ON A SURFACE THEREOF, MANUFACTURING METHOD FOR THE SAME, AND REFLECTION TYPE LIQUID CRYSTAL DISPLAY DEVICE EMPLOYING THE REFLECTOR

(75) Inventors: Tomomasa Takatsuka, Sendai; Koichi Moue, Iwaki; Masao Ohkita, Furukawa; Tatsuya Moriike; Tetsushi Tanada, both of Iwaki; Akito Miura, Miyagi-ken; Mitsuru Kano, Iwaki, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/123,909

(22) Filed: Jul. 28, 1998

(30) Foreign Application Priority Data

Jul. 29, 1997 (JP) .............................. 9-203637
Jul. 29, 1997 (JP) .............................. 9-203638
Feb. 24, 1998 (JP) ............................ 10-042597

(51) Int. Cl.$^7$ .............................................. G02F 1/1335
(52) U.S. Cl. ..................................................... 349/113
(58) Field of Search ............................ 372/99; 359/838; 349/113; 313/113; 362/348

(56) References Cited

U.S. PATENT DOCUMENTS 4,456,336 A * 6/1984 Chung et al. ............... 349/113
4,904,060 A    2/1990 Grupp
5,245,454 A    9/1993 Blonder

FOREIGN PATENT DOCUMENTS

EP          0 084 930   * 8/1983 ................. 349/113

\* cited by examiner

Primary Examiner—W. Malinowski
(74) Attorney, Agent, or Firm—Brinks Hofer Gilson & Lione

(57) ABSTRACT

A brighter and whiter reflector provides high reflection efficiency over a wide range of angles. An indenting tool is pressed against the surface of a matrix base material; the pressing operation is repeated while changing the position of the indenting tool on the surface of the base material for the matrix to successively form many pits, the inner surfaces of which are shaped like partial spheres, on the mold surface of the matrix base material so as to provide it as the matrix for forming the reflector. Then, a transfer mold having a mold surface which has a reversed pattern of the pits and projections of the mold surface of the matrix is made, and the mold surface of the transfer mold is transferred to the surface of the base material for the reflector to provide a reflector (1). Pits (4) of the reflector (1) are formed so that the depths the pits (4) range from 0.1 $\mu$m to 3 $\mu$m, the tilt angles of the inner surfaces of the pits (4) are distributed in the range of −18 degrees to +18 degrees, and the pitches between adjoining pits (4) range from 5 $\mu$m to 50 $\mu$m. A reflection type liquid crystal display device in accordance with the present invention is equipped with the reflector (1).

8 Claims, 14 Drawing Sheets

REFLECTOR HAVING PITS AND PROJECTIONS ON A SURFACE THEREOF, MANUFACTURING METHOD FOR THE SAME, AND REFLECTION TYPE LIQUID CRYSTAL DISPLAY DEVICE EMPLOYING THE REFLECTOR

BACKGROUND OF THE INVENTION

1. Field of the Invention

The present invention relates to a reflector which provides uniform brightness and whiteness over an extensive range, a manufacturing method for the same, and a reflection type liquid crystal display device that employs the reflector.

2. Description of the Related Art

In recent years, a reflection type liquid crystal display device has been extensively used as the display unit of a handy type computer or the like. The reflection type liquid crystal display device is equipped with a reflector for reflecting the light which has entered the display surface thereof to provide display. In the past, reflectors having mirror surfaces or reflectors having random pits and projections on the surfaces thereof have been used.

Among the aforesaid conventional reflectors, a conventional reflector 260 equipped with a surface with random pits and projections is illustrated in FIG. 16. This reflector is produced by heating a polyester film 261 which is, for example, 300 to 500 $\mu$m thick, to form an uneven surface 261a having projections of a few $\mu$m high, then further forming a reflection film 262 composed of aluminum, silver, etc. on the uneven surface 261a by employing such a process as vapor deposition.

As illustrated in FIG. 17, in the conventional reflection type liquid crystal display device employing this type of reflector 260, transparent electrode layers 253 and 254 are provided on the opposed surfaces of a pair of glass substrates 251 and 252, respectively. Further, oriented films 255 and 256 of liquid crystal are respectively provided on the transparent electrode layers 253 and 254 and a liquid crystal layer 257 is disposed between the oriented films 255 and 256. A first polarizing plate 258 and a second polarizing plate 259 are provided on the outer sides the glass substrates 251 and 252, respectively, the reflector 260 being mounted on the outer side of the second polarizing plate 259 so that the surface thereof facing the reflection film 262 is oriented toward the second polarizing plate 259.

In the reflection type liquid crystal display device 250 having the constitution described above, the light which has entered the first polarizing plate 258 is linearly polarized through the polarizing plate 258, and the polarized light passes through the liquid crystal layer 257 to be elliptically polarized. The elliptically polarized light is then linearly polarized again through the second polarizing plate 259, and the linearly polarized light is reflected by the reflector 260 and it passes through the second polarizing plate 259 and the liquid crystal layer 257 again before it exits from the first polarizing plate 258.

The reflector and the reflection type liquid crystal display device have the following reflection characteristics.

For instance, as illustrated in FIG. 16, the incidence angle of an incident light J from a point light source disposed on the reflection film 262 is set to a constant incidence angle of 30 degrees with respect to the normal line relative to the surface of the reflection film 262, and the reflectivity is measured when a reflection angle θ of reflected light K is changed from zero degree to 60 degrees. The measurement results have revealed that the reflectivity reaches almost a lowest level at a reflection angle of 20 degrees or less and 40 degrees or more at right and left, the peak of the reflectivity being observed at a reflection angle of 30 degrees. This trend has been found to be applicable to the measurements of an entire liquid crystal display device equipped with the reflector as well as to the reflector used alone. It has been discovered that the reflectivity reaches a peak at the reflection angle of 30 degrees, and it drops to almost zero percent at reflection angles of 23 degrees or less and 37 degrees or more.

In general, a reflector having a mirror surface exhibits a reflection characteristic in which extremely higher reflectivity is observed at a particular reflection angle in relation to an incidence angle than that in a reflector having random pits and projections on a surface thereof; it is characterized, however, by an extremely limited range of reflection angles at which high reflectivity is obtained, that is, it provides a limited range of visual field angles.

As described above, the conventional reflector with a reflecting surface equipped with random pits and projections has poor reflection efficiency with consequent low reflectivity as a whole, thus failing to fully meet the needs for a reflector that enables efficient reflection of incident light over a wider range of reflection angle. Accordingly, the reflection type liquid crystal display device employing this type of reflector has been posing a problem in that the visual field angles are limited to a range of about 25 degrees to about 35 degrees and that the brightness of the display surface is not satisfactory. There has been another problem: a reflector is required to provide whiteness as well as brightness; however, this type of conventional reflector is unsatisfactory in the whiteness of the reflecting surface because the light having different wavelengths cannot be reflected evenly in good balance. Further, the reflection characteristics including reflection angle and the intensity of reflected light of this type of reflector are automatically decided by the pits and projections formed at random; hence, they have not been controlled by optical design.

To solve the aforesaid problems, a reflector provided with many stripe grooves extending linearly on a surface thereof has been proposed. This reflector, however, has a limited range of reflection angle although it provides desired brightness at the reflection angles in a certain range in the direction perpendicular to the stripe grooves and it exhibits low reflectivity and an extremely limited range of reflection angles in the directions other than the direction perpendicular to the stripe grooves. Hence, the application of this type of reflector to a liquid crystal display device has not solved the foregoing problem of the limited range of visual field angles and insufficient brightness and whiteness of the display surface especially in the direction parallel to the stripe grooves.

SUMMARY OF THE INVENTION

Accordingly, the present invention has been made with a view toward solving the problems described above, and it is an object thereof to provide: a reflector capable of providing high reflection efficiency over a wide range of angles; a method for manufacturing the reflector; and a reflection type liquid crystal display device employing the reflector for the display surface thereof to provide a wider range of visual field angles and a higher level of brightness in any directions.

To these ends, according to one aspect of the present invention, there is provided a reflector wherein: many pits are formed in succession on a surface thereof, the inner surface of each of the pits being formed as a partial sphere; the pits are formed to have depths ranging from 0.1 μm to 3 μm at random, adjacent pits being disposed at random at pitches ranging from 5 μm to 50 μm; and the tilt angles of the inner surfaces of the pits are set within a range of −18 degrees to +18 degrees.

In the reflector in accordance with the present invention, many pits having the inner surfaces shaped as partial spheres are formed on a surface thereof, and the parameters thereof such as the depths of the pits and the pitches between adjoining pits are set to the ranges given above. By so doing, the tilt angles of the inner surfaces of the pits, namely, the tilt angles in a minute unit area, which are considered to govern the reflection angles of reflected light show a fixed distribution pattern in a certain range of angles. Further, since the inner surfaces of the pits are shaped like partial spheres, such a fixed distribution pattern of tilt angles can be accomplished in any directions rather than only in a particular direction in the reflector. Hence, the reflector in accordance with the present invention is able to provide uniformly high reflection efficiency in all directions so as to enable light having diverse wavelengths to be reflected in good balance. This makes it possible to realize a reflector that provides a higher level of brightness and whiteness than that of the conventional reflectors regardless of the direction from which it is observed.

The term "the depth of the pits" refers to the distance from the surface of the reflector to the bottoms of the pits; and the term "the pitches between adjacent pits" refers to the center-to-center distances of the pits which are circular in a top plan view. Further, the term "the tilt angles of the inner surfaces of the pits" means the following: when a minute range having a width of 0.5 μm is taken at an arbitrary spot of the inner surface of a pit 4 as illustrated in FIG. 8, the term refers to angle θ in relation to the horizontal surface of the slope in the minute range. The sign of angle θ is defined so that angle θ of the slope, for example, at right in FIG. 8 with respect to the normal line drawn onto the surface of the reflector carries the positive sign, while that of the slope at left carries the negative sign.

Preferably, the depths of the pits are set to 0.1 μm to 3 μm, the pitches between adjoining pits are set to 5 μm to 50 μm, and the tilt angles of the inner surfaces of the pits are set in the range of −18 degrees to +18 degrees as described above.

In particular, it is important to set the tilt angles so that they are distributed in the range of −18 degrees to +18 degrees and to set the pitches of the adjacent pits at random with respect to all directions in plane. This is important because, regularity in the pitches between adjoining pits would lead to an inconvenience in that an interference color of light develops, causing the reflected light to be colored. If the distribution of the tilt angles of the inner surfaces of the pits exceeds the range of −18 degrees to +18 degrees, then the angle of divergence of reflected light increases excessively and the reflection intensity drops. This makes it impossible to obtain a reflector with satisfactory brightness because the angle of divergence of the reflected light exceeds 36 degrees in the air and the peak of the reflection intensity in the liquid crystal display device goes down with a resultant increased total reflection loss.

If the depths of the pits exceed 3 μm, it would be impossible to cover the apexes of the projections with a flattening film in a subsequent process for flattening the pits, failing to accomplish desired flatness.

If the pitches between adjacent pits are below 5 μm, it would mainly cause the following problems: it would take much more time for processing because there are restrictions on the fabrication of a matrix for forming the reflector; the configuration that provides desired reflection characteristics cannot be obtained; and interference light emerges. For a practical use, if a diamond indenting tool that has a diameter of 30 μm to 100 μm usable for making the matrix for forming the reflector is employed, it is preferable to set the pitch of adjoining pits to 5 μm to 50 μm.

More preferably, the reflector in accordance with the present invention has the pits ranging from 0.6 μm to 1.2 μm in depth, the tilt angles of the inner surfaces being distributed in the range of −8 degrees to +8 degrees, and the pitches between adjacent pits ranging from 26.5 μm to 33.5 μm.

When the tilt angles of the inner surfaces of the pits are distributed within the range from −8 degrees to +8 degrees, the angle of divergence of the reflected light increases, making it possible to implement a brighter reflector.

Setting the depth of the pits to 0.6 μm or more controls excessive regular reflection, and setting them to 1.2 μm or less facilitates further flattening in the subsequent process. Likewise, setting the pitches between adjacent pits to 26.5 μm or more permits a shorter time required for fabricating the matrix for forming the reflector, and setting it 33.5 μm or less makes the configurations of the pits visually unrecognizable, thus leading to a higher quality of the reflector.

In the manufacturing method for the reflector in accordance with the present invention, a transfer mold having a mold surface, which has the reversed pattern of the pits and projections of the mold surface of a matrix for forming the reflector of a predetermined shape, is formed and the mold surface of the transfer mold is transferred to the surface of the base material for the reflector, then a reflection film is formed on the pits and projections of the surface of the base material for the reflector to complete the reflector.

Specifically, according the aforesaid method, the mold surface of the matrix for forming the reflector is directly transferred to the surface of the reflector via the transfer mold so as to form many pits having the inner surfaces shaped as partial spheres on a surface thereof. By so doing, the tilt angles of the inner surfaces of the pits, namely, the tilt angles in a minute unit area, which are considered to govern the reflection angles of reflected light, show a fixed distribution pattern within a certain range of angles. Further, since the inner surfaces of the pits are shaped like partial spheres, such a fixed distribution pattern of tilt angles can be accomplished in any directions rather than only in a particular direction in the reflector. Hence, the reflector in accordance with the present invention is able to provide uniformly high reflection efficiency in all directions so as to enable light having diverse wavelengths to be reflected in good balance. This makes it possible to realize a reflector that provides a higher level of brightness and whiteness than that of the conventional reflectors regardless of the direction from which it is observed.

The matrix for forming the reflector in accordance with the present invention is constituted by many pits which have the inner surfaces thereof shaped like partial spheres and which are formed in succession on the surface of the base material for the matrix, the pits ranging from 0.6 μm to 1.2 μm in depth, the tilt angles of the inner surfaces of the pits being distributed in the range of −8 degrees to +8 degrees, and the pitches between adjacent pits ranging from 26.5 μm to 33.5 μm.

Preferably the matrix for forming the reflector has pits that range from 0.6 μm to 1.2 μm in depth, the tilt angles of the inner surfaces of thereof being distributed in the range of −8 degrees to +8 degrees, and the pitches between adjacent pits ranging from 26.5 μm to 33.5 μm.

The term "the depths of the pits" refers to the distance from the surface of the base material for the matrix to the bottoms of the pits; and the term "the pitches between adjacent pits" refers to the center-to-center distances of the pits which are circular in a top plan view. Further, the term "the tilt angles of the inner surfaces of the pits" means the following: when a minute range having a width of 0.5 μm is taken at an arbitrary spot of the inner surface of a pit 104 as illustrated in FIG. 15, the term refers to angle θ in relation to the horizontal surface of the slope in the minute range. The sign of angle θ is defined so that angle θ of the slope, for example, at right in FIG. 15 with respect to the normal line drawn onto the surface of the reflector carries the positive sign, while that of the slope at left carries the negative sign.

According to the manufacturing method of the matrix for forming the reflector in accordance with the present invention, an indenting tool having a spherical distal end is pressed against the surface of the base material for the matrix repeatedly by changing the position of the indenting tool on the surface of the base material for the matrix. By so doing, many pits having their inner surfaces shaped like partial spheres are formed in succession to complete the matrix for forming the reflector.

Specifically, according to the manufacturing method of the matrix for forming the reflector in accordance with the present invention, the matrix for molding the reflector provided with a number of pits having their inner surfaces shaped like partial spheres is produced by pressing an indenting tool with a spherical distal end against the base material for the matrix by using a rolling apparatus. The indenting tool used for this purpose is repeatedly pressed a great number of times against the surface of the base material for the matrix composed of a metal material such as brass, stainless steel, or tool steel having relatively high hardness; therefore, it is desirable to employ an indenting tool composed of diamond or other material having high hardness. The rolling apparatus repeats pressing while changing the position of the indenting tool on the surface of the base material for the matrix to form many pits in succession. The requirement in this case is the relative movement of the base material for the matrix and the indenting tool within the horizontal plane; hence, either the base material for the matrix or the indenting tool may be moved.

To form the foregoing pits, the distance of the vertical stroke of the indenting tool of the rolling apparatus, the horizontal moving distance of the base material for the matrix, the diameter of the distal end of the indenting tool, etc. should be adjusted so as to set the depths of the pits to be formed within the range of 0.1 μm to 3 μm at random, the pitch of adjoining pits within the range of 5 μm to 50 μm at random, and the tilt angles of the inner surfaces of the pits to be distributed within the range of −18 to +18 degrees.

More preferably, the depths of the pits are set within the range of 0.6 μm to 1.2 μm, the tilt angles of the inner surfaces of the pits are distributed within the range of −8 to +8 degrees, the pitch of adjoining pits is set within the range of 26.5 μm to 33.5 μm, and the matrix base material provided with the pits is used as the matrix for forming the reflector.

The reflection type liquid crystal display device in accordance with the present invention is equipped with the foregoing reflector, namely, the reflector that has many pits formed in succession on a surface thereof, the inner surface of each of the pits being formed as a partial sphere; wherein the pits are formed to have depths ranging from 0.1 μm to 3 μm, adjacent pits being disposed at pitches ranging from 5 μm to 50 μm; and the tilt angles of the inner surfaces of the pits are set within a range of −18 degrees to +18 degrees. The reflector may be of an external installation type mounted on the outer side of a liquid crystal cell or a built-in type mounted on the inner surface of the substrate constituting the liquid crystal cell.

The reflection type liquid crystal display device in accordance with the invention has the reflector that is able to provide high reflection efficiency in all directions so as to enable light having diverse wavelengths to be reflected in good balance. This makes it possible to implement a wider visual angle and a brighter display surface than those of the conventional reflection type liquid crystal display devices.

DESCRIPTION OF THE PREFERRED EMBODIMENTS

An embodiment of a reflector and an embodiment of a reflection type liquid crystal display device in accordance with the present invention will now be described with reference to FIG. 1 through FIG. 8.

Figure 1:
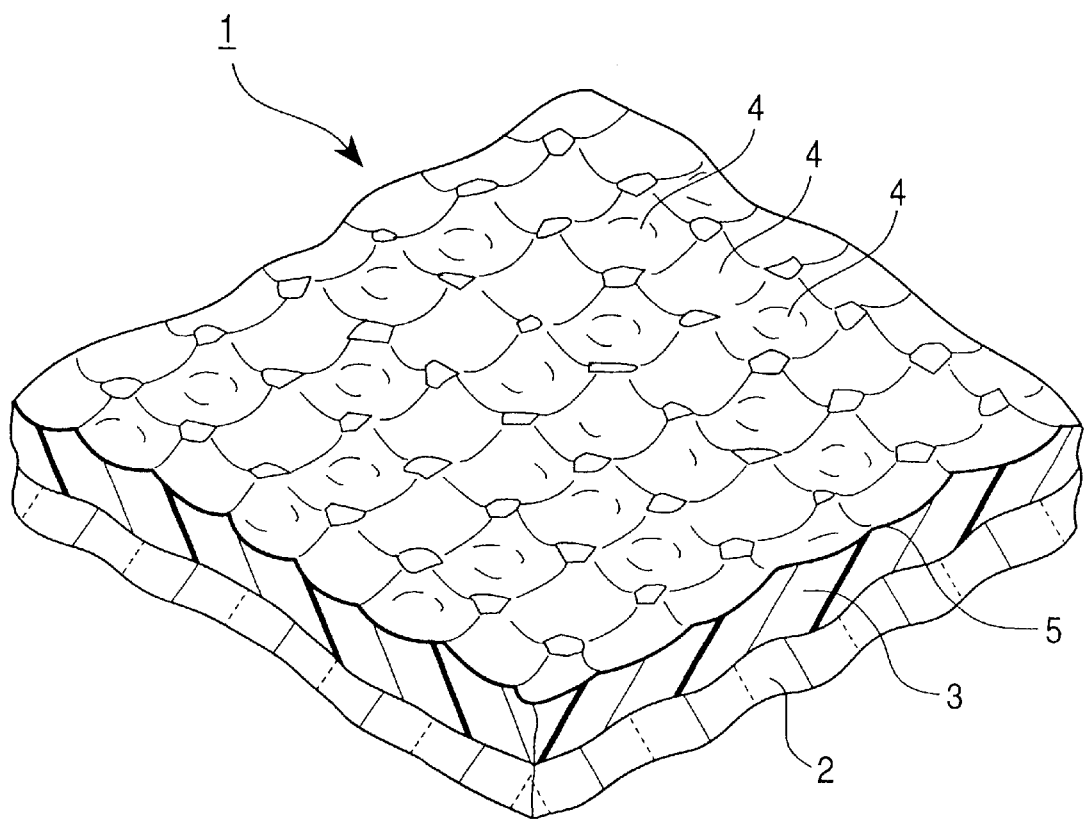
FIG. 1 is a perspective view showing an embodiment of the reflector in accordance with the present invention.

FIG. 1 is a diagram showing the reflector of the embodiment. As shown in the drawing, a reflector 1 of the embodiment is made as follows: many pits 4, each of which has the inner surface thereof shaped like a partial sphere, are formed in succession so that they are partly overlapped with each other on the surface of a tabular resin base material 3 (the base material for a reflector) which is provided on a substrate 2 made of, for example, glass and which is composed of a photosensitive resin layer or the like, then a reflection film 5 composed of a thin film of, for example, aluminum or silver is formed thereover by such a process as vapor deposition or printing.

Figure 8:
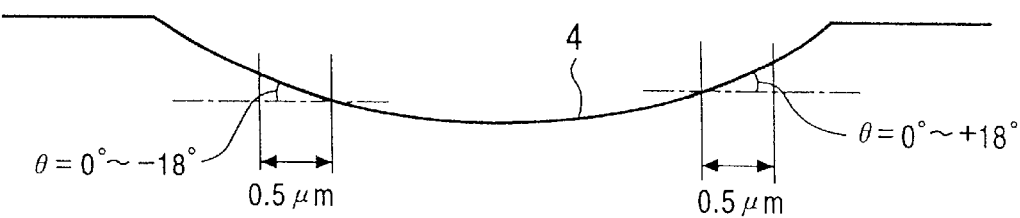
FIG. 8 is a diagram illustrating the tilt angle of an inner surface of a pit of the reflector shown in FIG. 1.

Preferably, the pits 4 are formed to have depths ranging from 0.1 $\mu$m to 3 $\mu$m at random, adjacent pits 4 are disposed at random at pitches ranging from 5 $\mu$m to 50 $\mu$m, and the tilt angles of the inner surfaces of the pits 4 are set within the range of −18 degrees to +18 degrees as shown in FIG. 8.

It is especially important to set the tilt angles of the inner surfaces of the pits 4 so that they are distributed in the range of −18 degrees to +18 degrees and to set the pitches of the adjacent pits 4 at random in all directions in plane. This is important because, regularity in the pitches between the adjoining pits 4 would lead to an inconvenience in that an interference color of light develops, causing the reflected light to be colored. If the distribution of the tilt angles of the inner surfaces of the pits 4 exceeds the range of −18 degrees to +18 degrees, then the angle of divergence of reflected light increases excessively and the reflection intensity drops. This makes it impossible to obtain a reflector with satisfactory brightness because the angle of divergence of the reflected light exceeds 36 degrees in the air and the peak of the reflection intensity in the liquid crystal display device goes down with a resultant increased total reflection loss.

If the depths of the pits 4 exceed 3 $\mu$m, it would be impossible to cover the apexes of the projections with a flattening film in a subsequent process for flattening the pits 4, failing to accomplish desired flatness.

If the pitches between adjacent pits 4 are below 5 $\mu$m, it would mainly cause the following problems: it would take much more time for processing because there are restrictions on the fabrication of a matrix for forming the reflector; the configuration that provides desired reflection properties cannot be obtained; and interference light emerges. For a practical use, if a diamond indenting tool that has a diameter of 30 $\mu$m to 100 $\mu$m usable for making the matrix for forming the reflector is employed, it is preferable to set the pitch of adjoining pits 4 to 5 $\mu$m to 50 $\mu$m.

The manufacturing method for the reflector having the constitution described above will now be explained in conjunction with FIG. 2 through FIG. 5.

To fabricate the reflector, the matrix for forming the reflector that provides an original plate is made first. The method for making the original plate will be explained first.

Figure 2A:
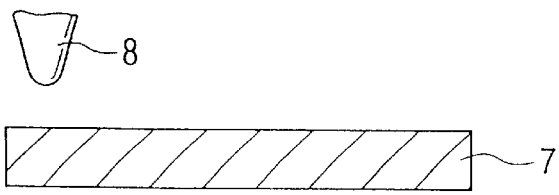
FIG. 2 shows the steps in order for manufacturing the reflector shown in FIG. 1.
Figure 2B:
Figure 3:
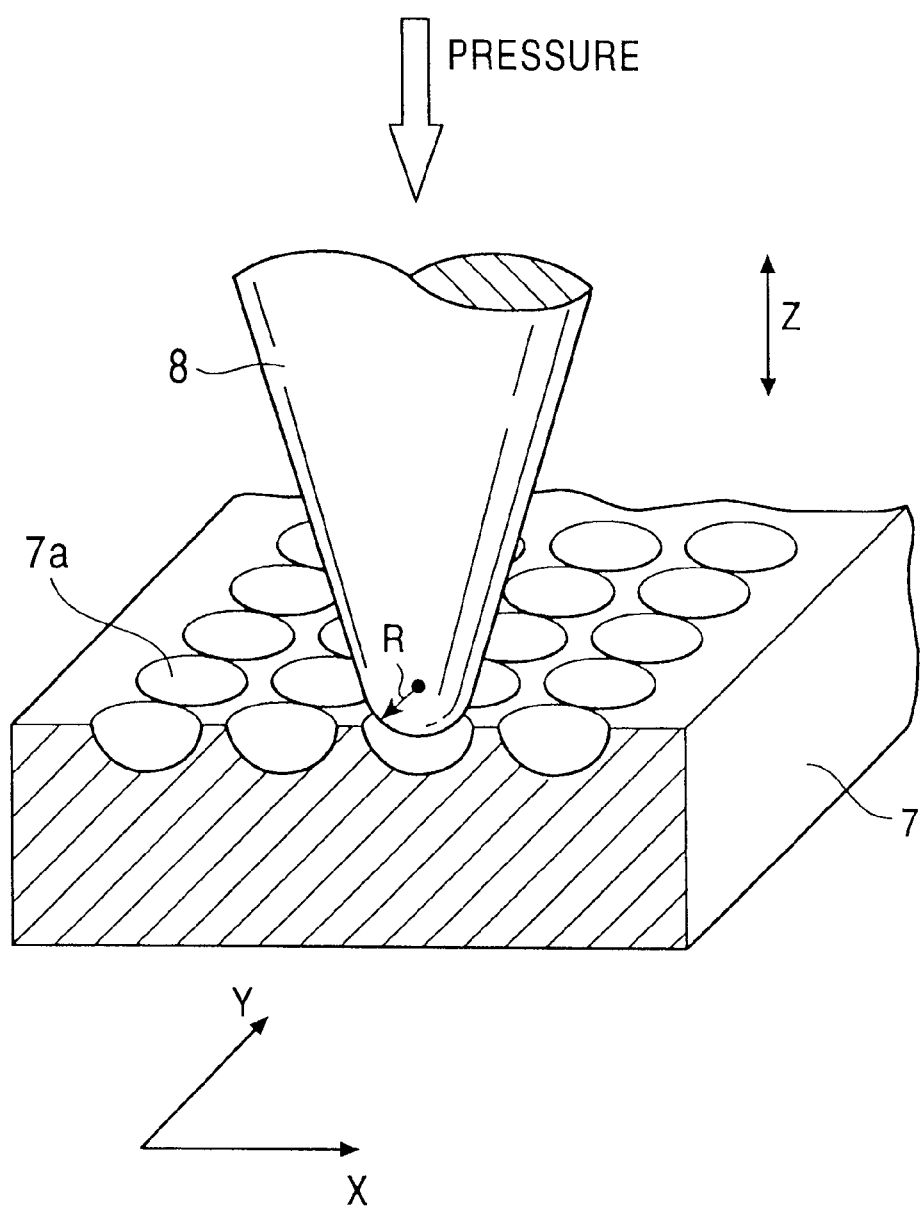
FIG. 3 shows the steps in order for manufacturing the matrix employed for forming the reflector shown in FIG. 1; it shows a diamond indenting tool pressing a matrix base material.

As shown in FIG. 2A, a tabular matrix base material 7 which is composed, for example, of brass, stainless steel, or tool steel and which has a flat surface is fixed on the table of a rolling apparatus. Then, a diamond indenting tool 8 having a spherical distal end of a predetermined diameter R is pressed against the surface of the matrix base material 7 and the matrix base material 7 is moved horizontally before the diamond indenting tool 8 is vertically moved to press the surface again. By repeating this series of steps many times to roll many pits 7a having different depths and disposing pitches in the surface of the matrix base material 7 to make a matrix 9 for forming the reflector as shown in FIG. 2B. As shown in FIG. 3, the rolling apparatus employed for this purpose has; a table on which the matrix base material 7 is fixed and which moves in directions X and Y in the horizontal plane with a resolution of 0.1 $\mu$m; and the diamond indenting tool 8 which moves in the perpendicular direction or direction Z with a resolution of 1 $\mu$m. Preferably, the diameter R of the distal end of the diamond indenting tool 8 should be about 20 $\mu$m to about 100 $\mu$m. For instance, to set the depth of the pit 7a to approximately 2 $\mu$m, the diameter R should be 30 $\mu$m to 50 $\mu$m; or to set the depth of the pit 7a to approximately 1 $\mu$m, the diameter R should be 50 $\mu$m to 100 $\mu$m.

The procedure of the rolling by the diamond indenting tool is as described below.

Figure 4:
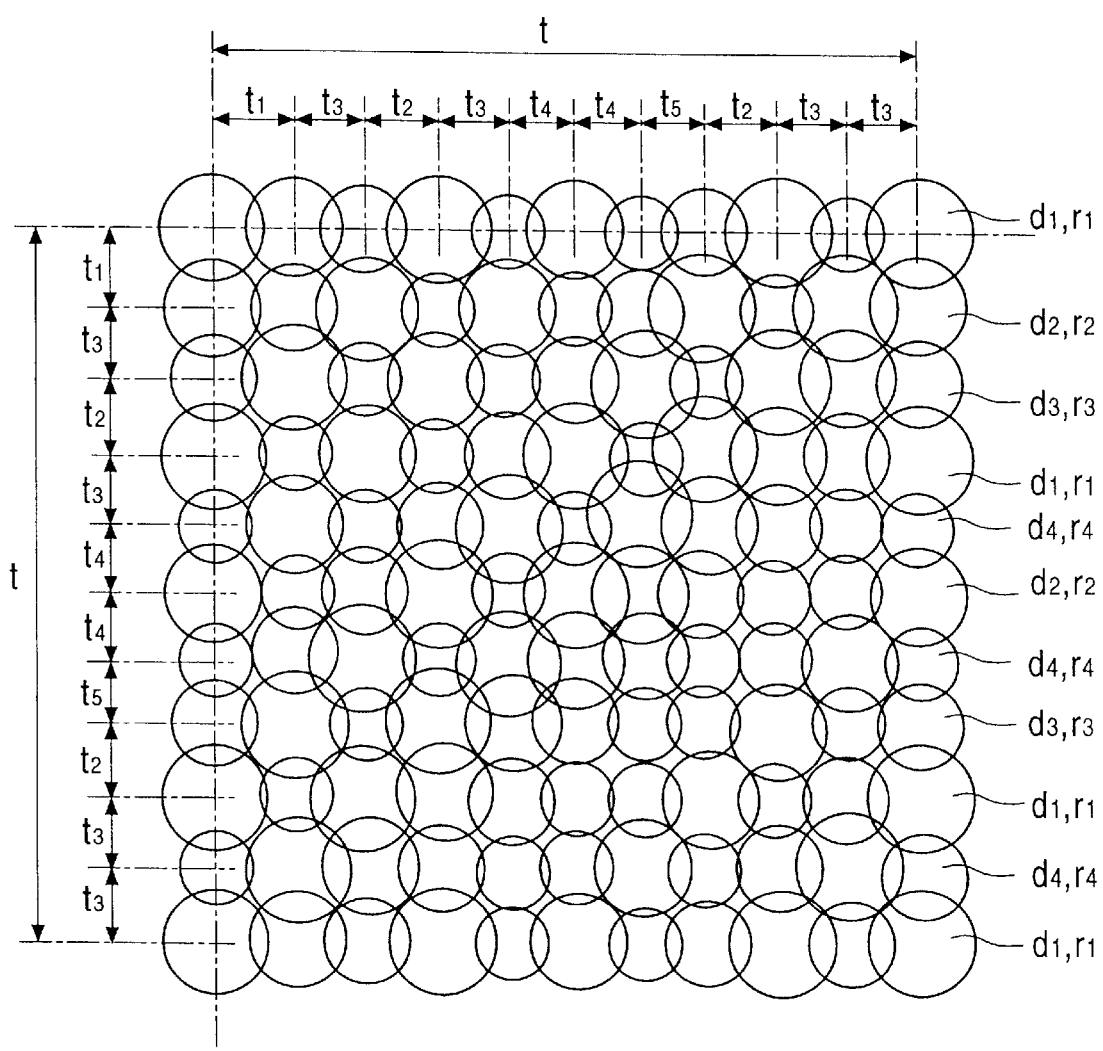
FIG. 4 is a top plan view showing the pattern of rolling by the diamond indenting tool in the manufacturing process of the matrix shown in FIG. 3.

FIG. 4 is a top plan view showing a rolling pattern. As shown in the drawing, the pitches of adjoining pits of a horizontal row are t1 (=17 $\mu$m), t3 (=15 m), t2 (=16 $\mu$m), t3, t4 (=14 $\mu$m), t4, t5 (=13 $\mu$m), t2, t3, and t3 from the left. The same pattern applies to the pitches of the adjoining pits of a vertical row. The four different depths (denoted by d1, d2, d3, and d4 in the drawing) are set in the range of 1.1 $\mu$m to 2.1 $\mu$m to form the round pits by pressing which have four different radii of r1 (=11 $\mu$m), r2 (=10 $\mu$m), r3 (=9 $\mu$m), and r4 (=8 $\mu$m). For instance, the radii of the pits of a vertical row are r1, r2, r3, r1, r4, r2, r4, r3, r1, r4, and r1 from the top.

Figure 5:
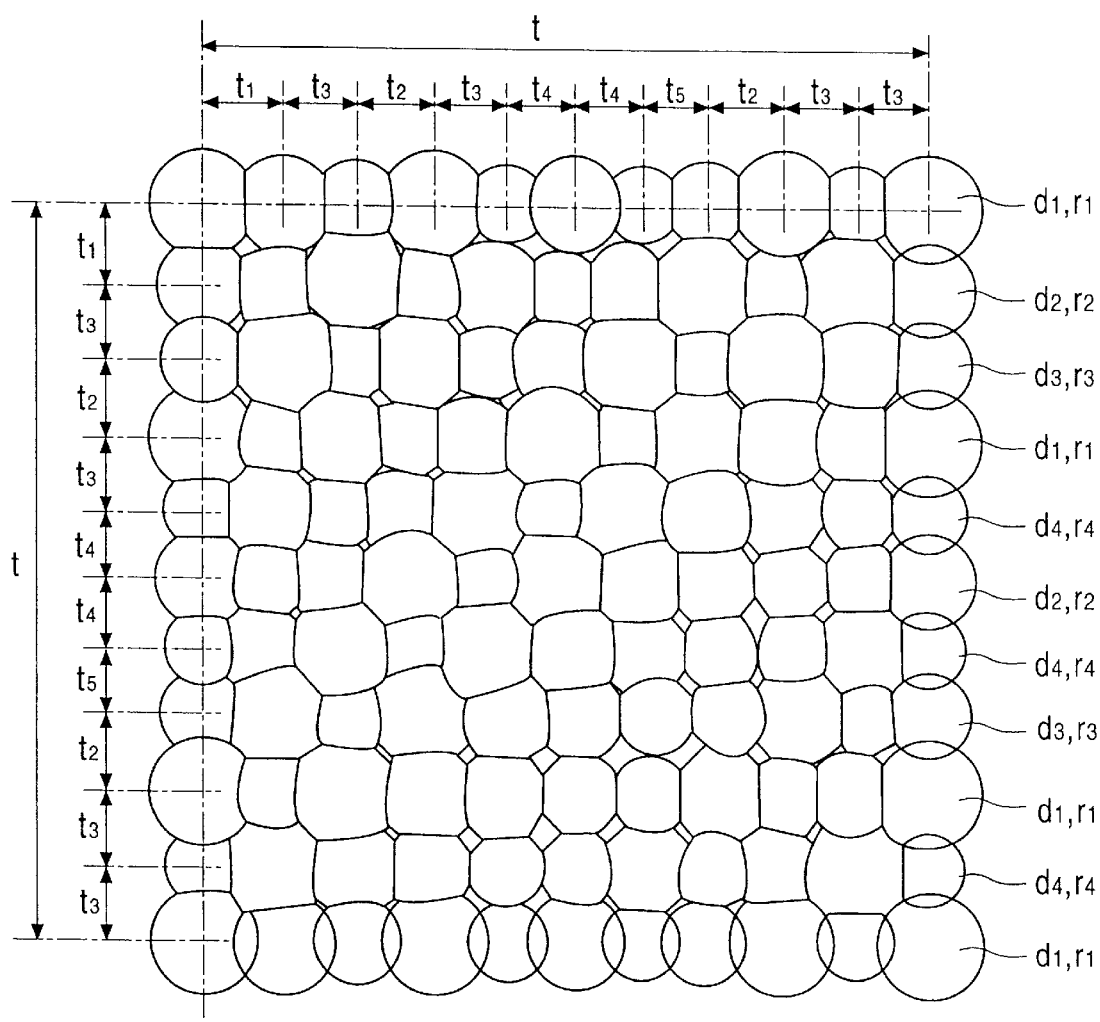
FIG. 5 is a top plan view showing the configuration of the entire pit assembly after the rolling shown in FIG. 4.

The sequence of actual rolling is such that, for example, the pits of depth d1 are formed discontinuously in the topmost horizontal row, then the pits of depth d2, depth d3, and depth d4 are formed by repeating the rolling operation in the four different depth patterns so as to complete the topmost horizontal row of pits. After that, the same series of steps is repeated to form the second top horizontal row of pits. In this way, all the pits in the patterns are formed. FIG. 4 shows a rolling pattern of t×t (t=150 $\mu$m) which is repeatedly implemented to complete the reflector. As illustrated in FIG. 4, the pressed marks of adjoining pits are partly overlapped with each other, so that the top plan view of all pits upon completion of the rolling is as shown in FIG. 5.

Thus, the matrix 9 for forming the reflector is completed. This matrix 9 is repeatedly used to manufacture many reflectors.

In the case of the rolling apparatus, the table on which the matrix base material is fixed moves within a horizontal plane; the rolling apparatus, however, may alternatively be configured so that the diamond indenting tool moves in the horizontal direction because the requirement is that the position of the indenting tool on the surface of the matrix base material changes.

The material used for the matrix is not limited to brass, stainless steel, tool steel, etc.; it may be other metal material having high hardness. The indenting tool for pressing the matrix base material is not limited to diamond; it may be other material as long as it has high hardness.

Figure 2C:
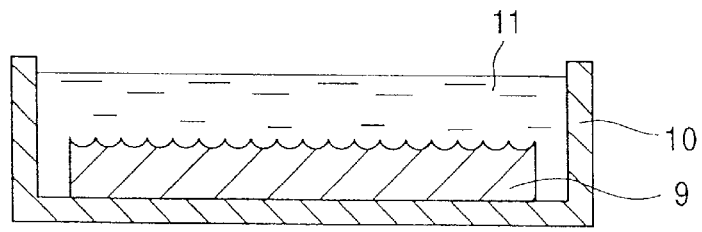

After that, as shown in FIG. 2C, the matrix 9 is placed and disposed in a box-shaped container 10 before a resin material 11 such as silicone is poured into the container 10. The resin material 11 is then left at room temperature until it hardens. The hardened resin part is taken out of the container 10, and unnecessary portions thereof are cut off to make a transfer mold 12 having a mold surface 12a that has many projections matching many pits of the mold surface of the matrix 9 as shown in FIG. 2D.

In the next step, a photosensitive resin liquid such as acrylic-based resist, polystyrene-based resist, rubber-azidebased resist, or imide-based resist is applied to the top surface of a glass substrate by the spin coating process, the screen printing process, spraying process, or other applying process. After completion of the application, a heating device such as a heating furnace or a hot plate is employed to pre-bake the photosensitive resin liquid on the substrate at a temperature in the range of, for example, 80 to 100 degrees Celsius for one minute or longer to form a photosensitive resin layer on the substrate. It is obvious that the pre-baking may be carried out at a different temperature from the one in the forgoing range and for a different time from the one mentioned above because the pre-baking conditions vary depending on the type of the photosensitive resin used. It is preferable to form the photosensitive layer to a thickness of 2 $\mu$m to 5 $\mu$m.

Figure 2D:
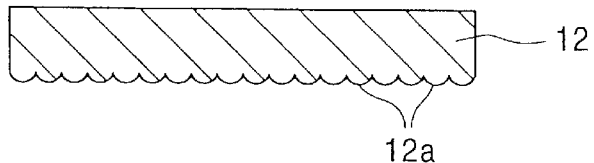
Figure 2E:
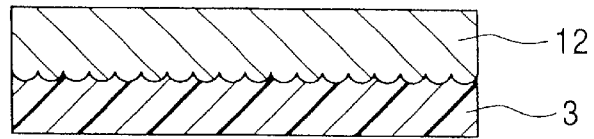
Figure 2F:
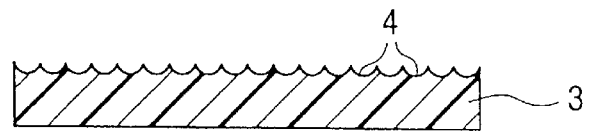

After that, as illustrated in FIG. 2E, the mold surface 12a of the transfer mold 12 shown in FIG. 2D is held pressed against the photosensitive resin layer 3 on the glass substrate for a fixed time, then the transfer mold 12 is removed from the photosensitive resin layer 3. In this way, the projections of the mold surface 12a are transferred to the surface of the photosensitive resin layer 3 to form many pits 4 as shown in FIG. 2F. Preferably, the pressing pressure applied at the time of pressing is set to a value suited to the type of photosensitive resin used; for example, the pressure is set to about 30 kg/cm$^2$ to about 50 kg/cm$^2$. Likewise, the pressing time should be set according to the type of the photosensitive resin; it may be set, for example, to about 30 sec. to about 10 min.

In the next step, light rays of ultraviolet rays (g, h, i rays) or the like for hardening the photosensitive resin layer 3 are irradiated from the rear surface side of the transparent glass substrate to cure the photosensitive resin layer 3. The light rays to apply such as the ultraviolet rays having an intensity of 50 mJ/cm$^2$ or more should be sufficient to cure the photosensitive resin layer; it is obvious, however, light rays of an intensity higher than that may be applied depending on the type of photosensitive resin layer. The same heating furnace, hot plate, or other heating device as that used for the pre-baking may be used to carry out post-baking to heat the photosensitive resin layer 3 on the glass substrate at, for example, approximately 240 degrees Celsius for 1 minute or longer so as to fire the photosensitive resin layer 3 on the glass substrate.

Lastly, a film of aluminum, for example, is formed on the surface of the photosensitive resin layer 3 by electron beam deposition or the like to form the reflection film along the surface of the pits to complete the reflector 1 of the embodiment.

Figure 6:
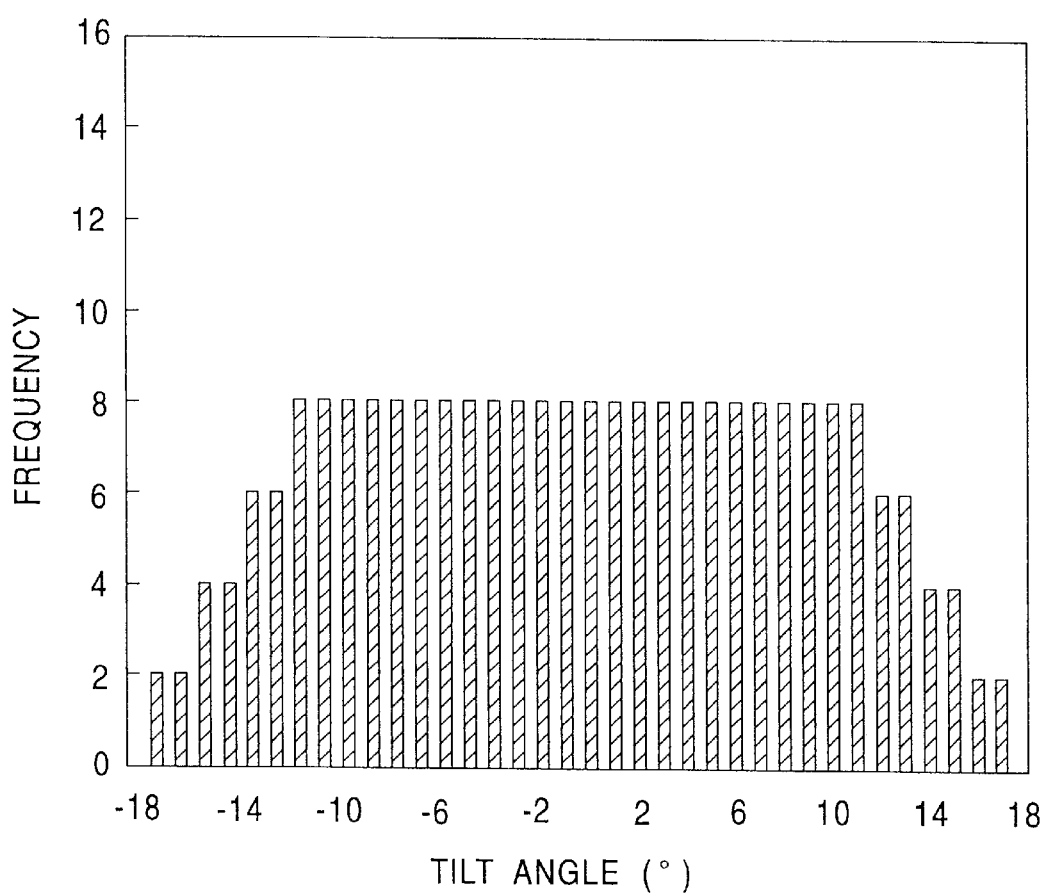
FIG. 6 illustrates the distribution of the tilt angles of the inner surfaces of the pits in the reflector shown in FIG. 1.

In this reflector 1, many pits 4, each of which has its inner surface shaped like a partial sphere, are formed on the surface thereof, and the values including the depths of the pits 4 and the pitches between the adjacent pits 4 are set within the ranges defined above; hence, the distribution of the tilt angles of the inner surfaces of the pits shows a certain pattern in a fixed angle range. As an example, the distribution of the tilt angles of the inner surfaces of the pits in the reflector 1 of the embodiment is shown in FIG. 6; the axis of abscissa indicates the tilt angle, while the axis of ordinate indicates the frequency of the existence of the tilt angles. As illustrated in the chart, the tilt angles exhibit a nearly fixed distribution pattern in the range of −18 degrees to +18 degrees, especially in the range of −10 degrees to +10 degrees. Furthermore, the inner surfaces of the pits 4 are spherical and symmetrical in all directions; hence, the fixed distribution pattern of the tilt angles can be implemented in all directions rather than in any particular direction.

The tilt angles of the inner surfaces of the pits are considered to govern the reflection angle of light reflected on the inner surfaces of the pits. In the case of this embodiment, since the fixed distribution pattern of tilt angles is implemented in all directions of the reflector, uniform angle of refection and reflection efficiency can be obtained in all directions, enabling light of various wavelengths to be reflected in good balance. In other words, the reflector in accordance with the embodiment is capable of providing a higher level of brightness and whiteness than those of the conventional reflectors regardless of the direction from which a user observes.

The matrix 9 for forming the reflector can be fabricated simply by moving the diamond indenting tool 8 vertically to press the surface of the matrix base material 7; therefore, the diamond indenting tool 8 and the matrix base material 7 do not rub each other. As a result, the surface configuration of the diamond indenting tool 8 is accurately transferred to the matrix 9. If the distal end of the indenting tool 8 is provided with a mirror surface, then the inner surfaces of the pits of the matrix 9 and the inner surfaces of the pits of the reflector accordingly can be easily provided with mirror surfaces.

Unlike the conventional reflector wherein the surface with pits and projections is formed by heating the resinous film such as a polyester film, the conditions of the inner surfaces of the pits including the depths, diameters, and pitches of the pits in the reflector 1 in accordance with the embodiment are all controlled. This makes it possible to shape the pits of the reflector almost exactly as originally designed by employing a high-accuracy rolling apparatus. Hence, according to this method, the reflection properties including the reflection angle and reflection efficiency of the reflector to be prepared can be controlled more easily than in conventional reflectors, permitting a desired reflector to be obtained.

Obviously, the specific values such as the depths, diameters, and pitches of the pits 4 of the reflector 1 and the rolling pattern of the pits shown in FIG. 4 are just examples and they may be changed as necessary. Furthermore, the materials for the reflector base material, the matrix base material, the transfer mold, etc. may also be changed as necessary.

A super twisted nematic (STN) reflection type liquid crystal display device equipped with the foregoing reflector will now be described.

Figure 7:
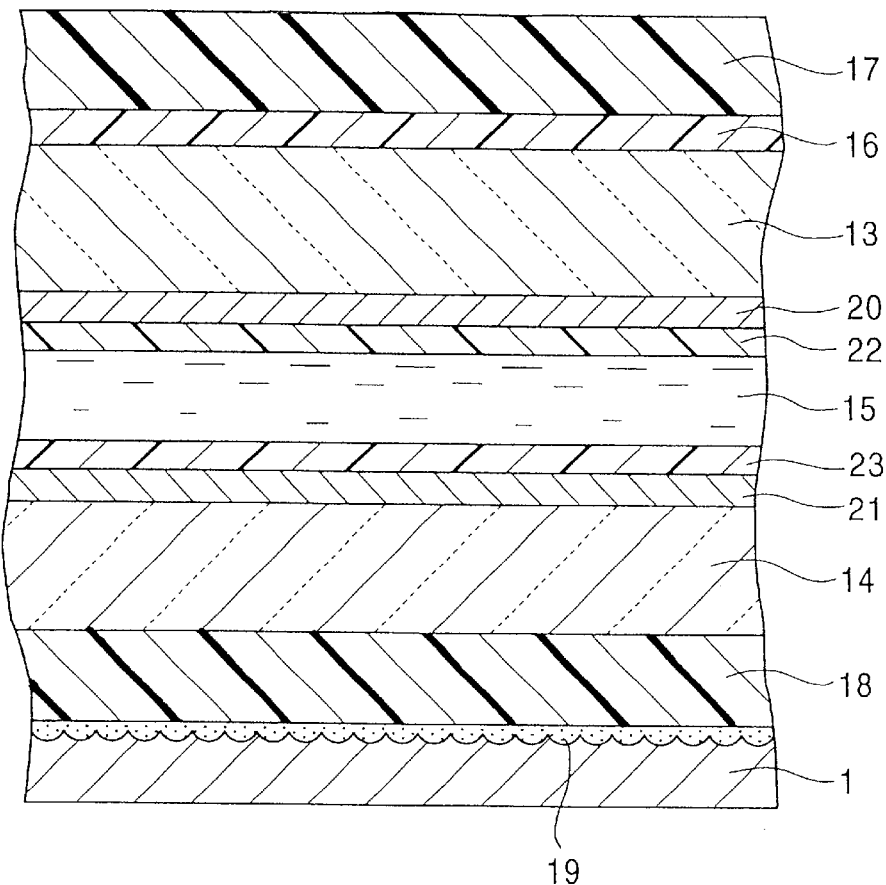
FIG. 7 is a sectional view showing a reflection type liquid crystal display device that is an embodiment of the present invention.

As shown in FIG. 7, in this reflection type liquid crystal display device, a liquid crystal layer 15 is provided between a pair of a glass substrate 13 on the display side and a glass substrate 14 on the rear surface side, each being, for example, 0.7 mm thick. A phase difference plate 16 composed of polycarbonate resin, polyarylate resin, or the like is provided on the top surface of the glass substrate 13 on the display side, and a first polarizing plate 17 is provided on the top surface of the phase difference plate 16. Further, a second polarizing plate 18 and the reflector 1 shown in FIG. 1 are provided in the order, in which they are listed, on the bottom surface of the glass substrate 14 on the rear surface side.

The reflector 1 is installed so that the surface thereof having the pits 4 is opposed to the bottom surface of the second polarizing plate 18. The gap between the second polarizing plate 18 and the reflector 1 is filled with a viscous member 19 made of a material such as glycerin that does not adversely affect the refractive index of light.

Transparent electrode layers 20 and 21 composed of indium tin oxide (ITO) or the like are formed on the opposed surfaces of the two glass substrates 13 and 14, respectively.

Further, oriented films 22 and 23 composed of polyimide resin or the like are provided on the transparent electrode layers 20 and 21, respectively. The liquid crystal in the liquid crystal layer 15 is twisted 240 degrees due to the relationship mainly between the oriented films 22 and 23.

A color filter, not shown, may be formed by printing or the like between the glass substrate 14 on the rear surface side and the transparent electrode layer 21 so that the liquid crystal display device provides color display.

As explained above, in the liquid crystal display device in accordance with the embodiment, the reflector 1 itself features wider reflection angles of the incident light and higher reflection efficiency in all directions. Accordingly, the liquid crystal display device is able to provide a wider range of visual field angles and a higher level of brightness than those in the conventional liquid crystal display devices regardless of the direction from which the user observes the display surface.

In the reflection type liquid crystal display device of the embodiment, the description has been given to the example of the external type reflector which is disposed on the outer side of the second polarizing plate; however, the reflector may be the built-in type where it is attached to the opposed surface of the glass substrate on the rear surface side. Further, the description has been given to the STN type as the example of the liquid crystal display device; however, the reflector in accordance with the present invention can obviously be applied also to a twisted nematic (TN) type liquid crystal display device in which the twist angle of the liquid crystal molecules of the liquid crystal layer has been set to 90 degrees.

Another embodiment of the reflector and another embodiment of the reflection type liquid crystal display device in accordance with the present invention will now be described with reference to FIG. 9 through FIG. 15.

Figure 9:
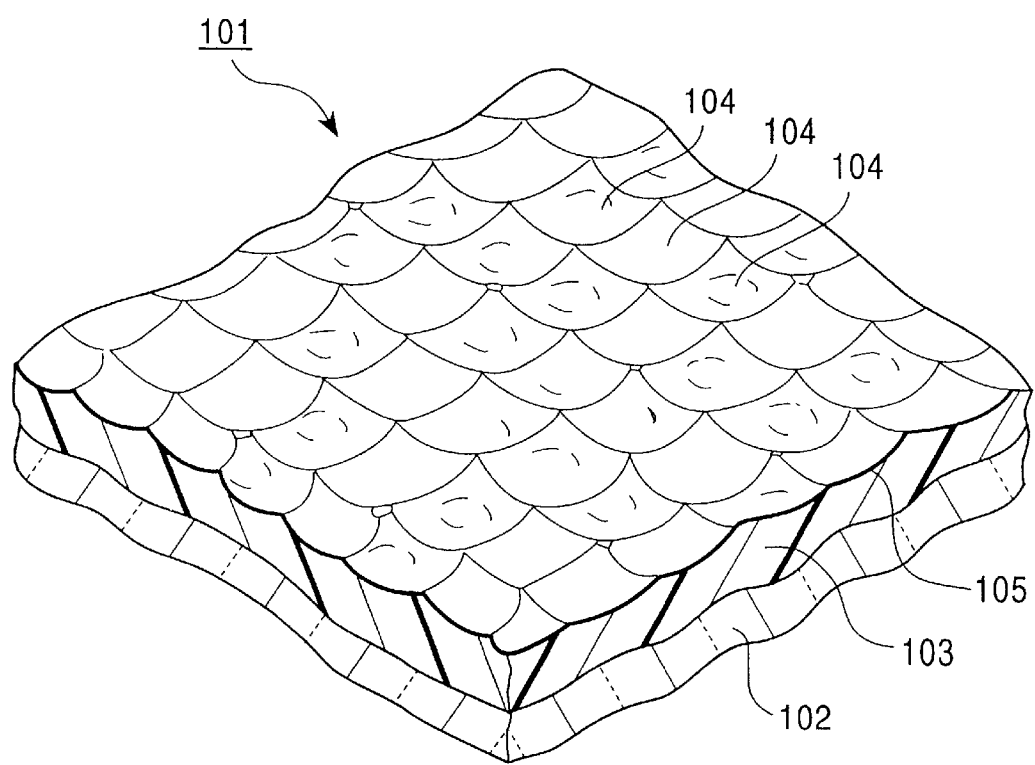
FIG. 9 is a perspective view showing another embodiment of the reflector in accordance with the present invention.

FIG. 9 is a diagram showing the reflector. As shown in FIG. 9, a reflector 101 is made as follows: many pits 104, each of which has the inner surface thereof shaped like a partial sphere, are formed in succession so that they are partly overlapped with each other on the surface of a tabular resin base material 103 (the base material for a reflector) which is provided on a substrate 102 made of, for example, glass and which is composed of a photosensitive resin layer or the like, then a reflection film 105 composed of a thin film of, for example, aluminum or silver is formed thereover by such a process as vapor deposition or printing.

Figure 15:
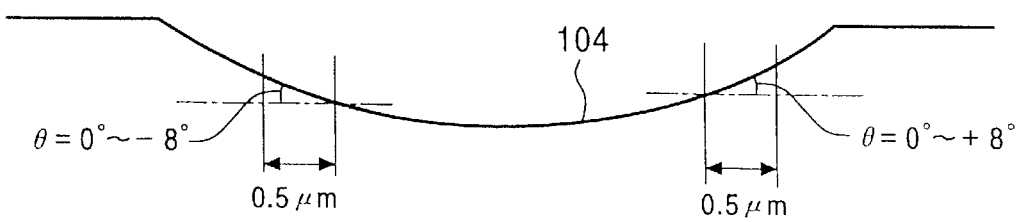
FIG. 15 is a diagram illustrating the tilt angle of an inner surface of a pit of the reflector shown in FIG. 9.
Figure 16:
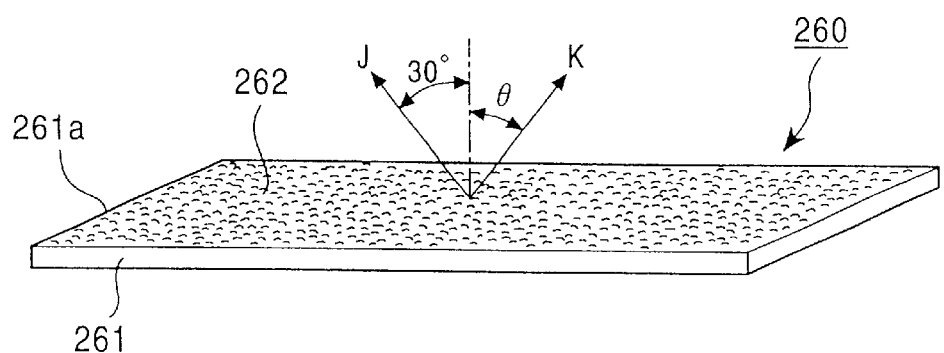
FIG. 16 is a perspective view showing an example of a conventional reflector.
Figure 17:
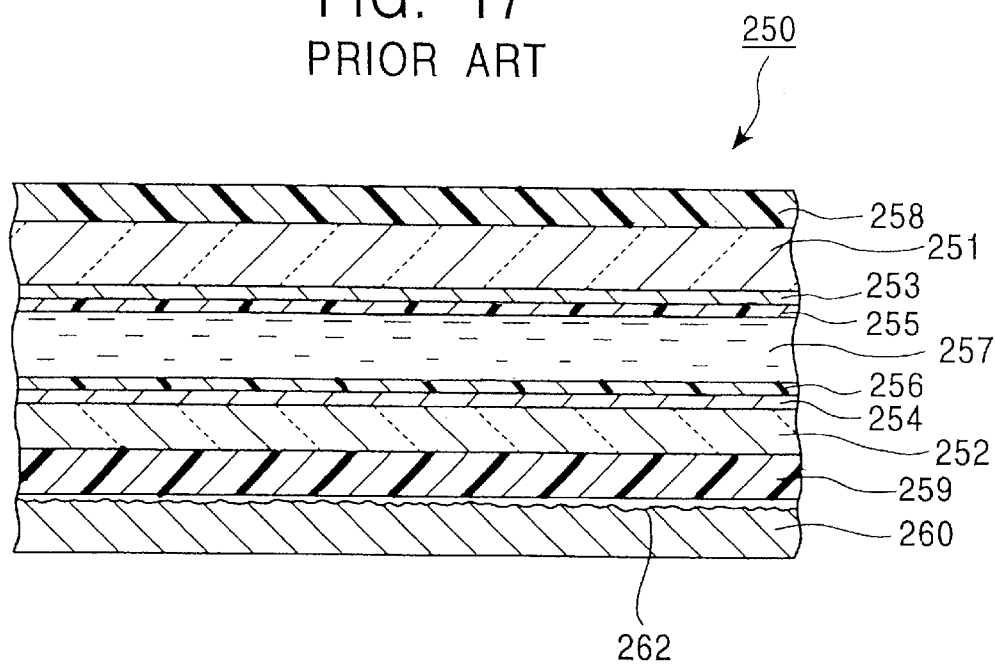
FIG. 17 is a sectional view showing an example of a conventional reflection type liquid crystal display device.

Preferably, the pits 104 are formed to have depths ranging from 0.6 $\mu$m to 1.2 $\mu$m at random, adjacent pits 104 are disposed at random at pitches ranging from 26.5 $\mu$m to 33.5 $\mu$m, and the tilt angles of the inner surfaces of the pits 104 are set within the range of −8 degrees to +8 degrees as shown in FIG. 15.

The manufacturing method for the reflector having the aforesaid constitution will be described in conjunction with FIG. 10.

To fabricate the reflector, the matrix for forming the reflector that provides an original plate is made first. The method for making the original plate will be explained first.

Figure 10A:
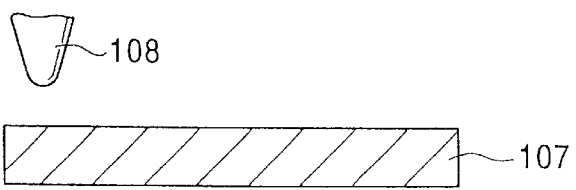
FIG. 10 shows the steps in order for manufacturing the reflector shown in FIG. 9.
Figure 10B:
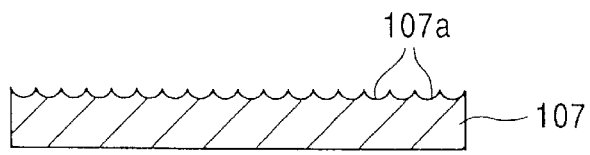

As shown in FIG. 10A, a tabular matrix base material 107 which is composed, for example, of brass, stainless steel, or tool steel and which has a flat surface is fixed on the table of a rolling apparatus. Then, a diamond indenting tool 108 having a spherical distal end of a predetermined diameter R is pressed against the surface of the matrix base material 107 and the matrix base material 107 is moved horizontally before the diamond indenting tool 108 is vertically moved to press the surface again. By repeating this series of steps many times to roll many pits 107a having different depths and disposing pitches in the surface of the matrix base material 107 to make a matrix 109 for forming the reflector as shown in FIG. 10B. The rolling apparatus employed is this embodiment has the same structure as that shown in FIG. 3; it has a table on which the matrix base material 107 is fixed and which moves in directions X and Y in the horizontal plane with a resolution of 0.1 $\mu$m; and the diamond indenting tool 108 which moves in the perpendicular direction or direction Z with a resolution of 1 $\mu$m. The diameter R of the distal end of the diamond indenting tool 108 should be, for example, approximately 135 $\mu$m.

The procedure of the rolling by the diamond indenting tool is as described below.

Figure 11:
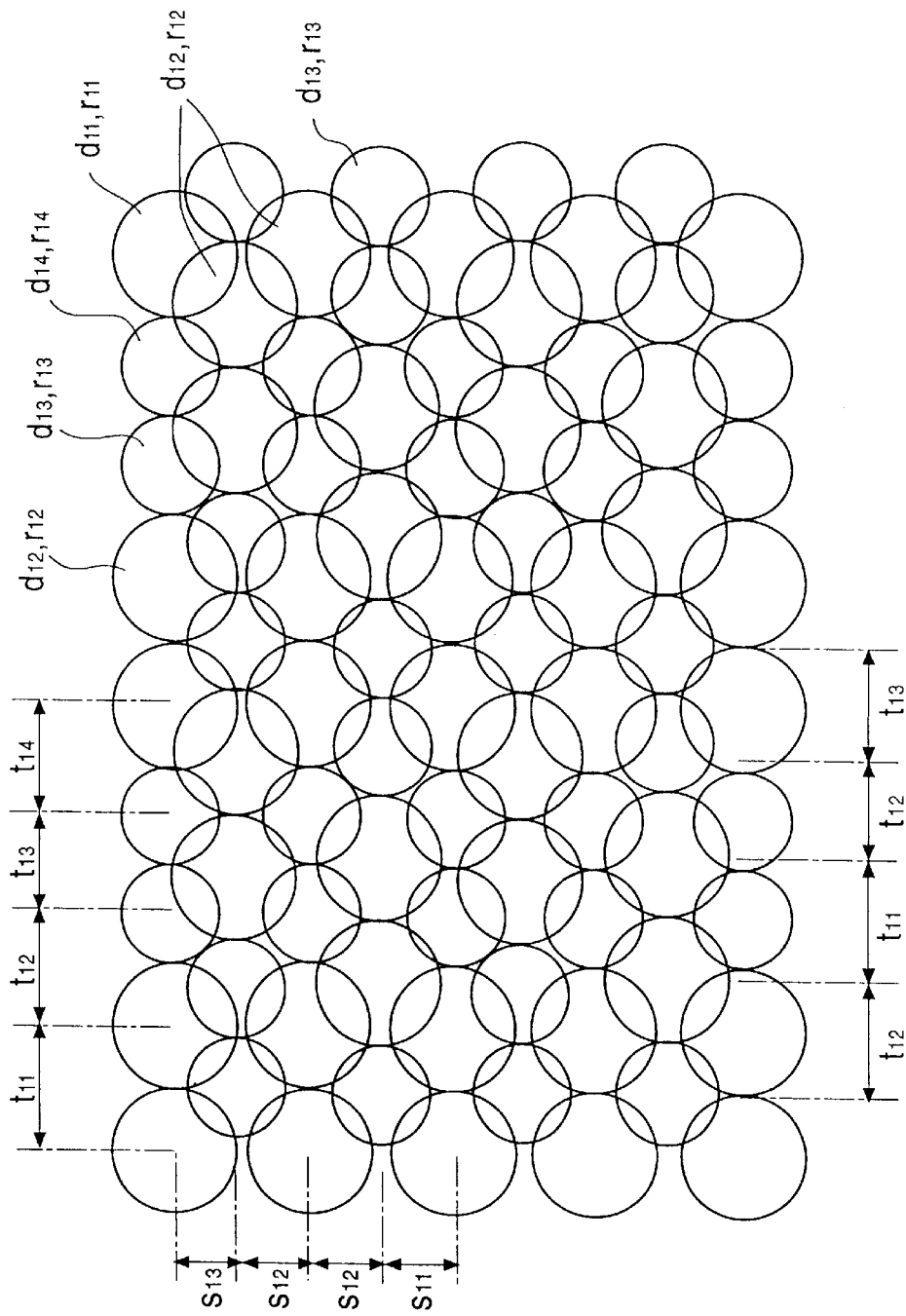
FIG. 11 is a top plan view showing the pattern of rolling by the diamond indenting tool in the manufacturing process of a matrix.

FIG. 11 is a top plan view showing a rolling pattern. As shown in the drawing, the pitches of adjoining pits of a horizontal row are repeated at the first row, the third row, and so on from the top, namely, they are repeated like t11 (=33.5 $\mu$m), t12 (=30 $\mu$m), t13 (=26.5 $\mu$m), and t12 in order from the left in odd-numbered rows. Likewise, the pitches of adjoining pits are repeated at the second row, the fourth row, and so on from the top, namely, they are repeated like t12, t11, t12, and t13 in order from the left in even-numbered rows. The positions of the pits of the odd-numbered rows are laterally shifted by about half the diameter of the pit from the positions of the pits of the even-numbered rows. The pitches between vertical rows are repeated like s13 (=17 $\mu$m), s12 (=19 pm), s12, and s11 (=20 $\mu$m) in order from the top.

The four different depths (denoted by d11, d12, d13, and d14 in the drawing) are set in the range of 0.6 $\mu$m to 1.2 $\mu$m to form the round pits by pressing which have four different radii of r11, r12, r13, and r14. For instance, the depths of the pits in the topmost row are d11, d12, d13, d14, d11, d12, d13, d14, and d11 in sequence from the left.

The sequence of actual rolling is such that, for example, the pits are formed in sequence from left to right in the topmost row, then the same is repeated at the second row, the third row, and so on from the top. Alternatively, the leftmost pits are formed in sequence from top to bottom first, then the same is repeated at the second column, the third column, and so on from left. Thus, all the pits in the pattern are formed. Ideally, the pits are formed at different depths and pitches utterly at random; however, this is difficult to implement in the aspect of the manufacturing technique. For this reason, the entire reflector is constituted by repeating such a pattern. Preferably, the repeating cycle is 150 $\mu$m or longer; the longer the cycle, the better result is obtained.

Figure 12:
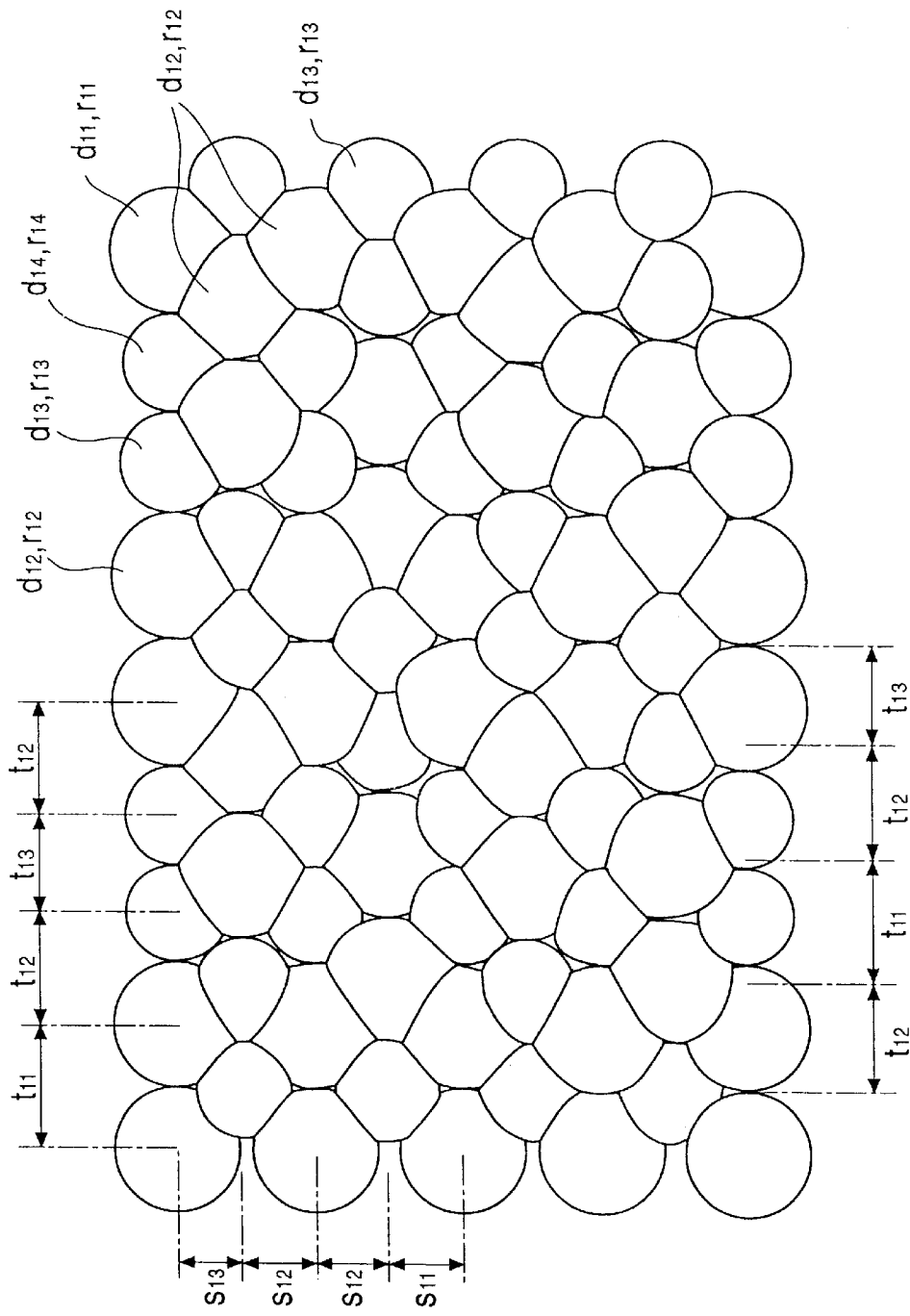
FIG. 12 is a top plan view showing the configuration of the entire pit assembly after completion of the rolling process shown in FIG. 11.

As illustrated in FIG. 11, the pressed marks of adjoining pits are partly overlapped with each other, so that the top plan view of all pits upon completion of the rolling is as shown in FIG. 12.

Thus, the matrix 109 for forming the reflector is completed. This matrix 109 is repeatedly used to manufacture many reflectors.

Figure 10C:
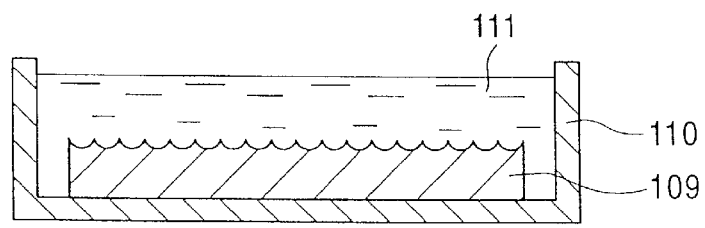

After that, as shown in FIG. 10C, the matrix 109 is placed and disposed in a box-shaped container 110 before a resin material 111 such as silicone is poured into the container 110. The resin material 111 is then left at room temperature until it hardens. The hardened resin part is taken out of the container 110, and unnecessary portions thereof are cut off to make a transfer mold 112 having a mold surface 112a that has many projections matching many pits of the mold surface of the matrix 109 as shown in FIG. 10D.

In the next step, a photosensitive resin liquid such as acrylic-based resist, polystyrene-based resist, rubber-azidebased resist, or imide-based resist is applied to the top surface of a glass substrate by the spin coating process, the screen printing process, spraying process, or other applying process. After completion of the application, a heating device such as a heating furnace or a hot plate is employed to pre-bake the photosensitive resin liquid on the substrate at a temperature in the range of, for example, 80 to 100 degrees Celsius for one minute or longer to form a photosensitive resin layer on the substrate. It is obvious that the pre-baking may be carried out at a different temperature from the one in the forgoing range and for a different time from the one mentioned above because the pre-baking conditions vary depending on the type of the photosensitive resin used.

It is preferable to form the photosensitive layer to a thickness of 2 $\mu$m to 5 $\mu$m.

Figure 10D:
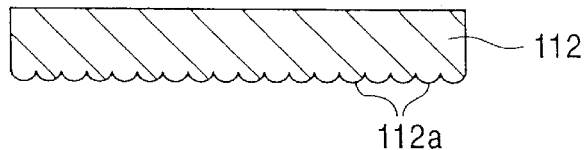
Figure 10E:
Figure 10F:
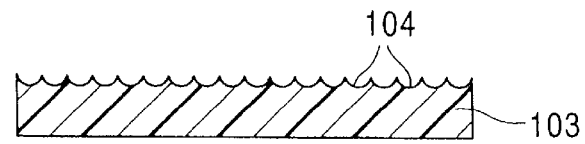

After that, as illustrated in FIG. 10E, the mold surface 112a of the transfer mold 112 shown in FIG. 10D is held pressed against the photosensitive resin layer 103 on the glass substrate for a fixed time, then the transfer mold 112 is removed from the photosensitive resin layer 103. In this way, the projections of the mold surface 112a of the transfer mold are transferred to the surface of the photosensitive resin layer 103 to form many pits 104 as shown in FIG. 10F. Preferably, the pressing pressure applied at the time of pressing is set to a value suited to the type of photosensitive resin used; for example, the pressure is set to about 30 kg/cm$^2$ to about 50 kg/cm$^2$. Likewise, the pressing time should be set according to the type of the photosensitive resin; it may be set, for example, to about 30 sec. to about 10 min.

In the next step, light rays of ultraviolet rays (g, h, i rays) or the like for hardening the photosensitive resin layer 103 are irradiated from the rear surface side of the transparent glass substrate to cure the photosensitive resin layer 103. The light rays to apply such as the ultraviolet rays having an intensity of 50 mJ/cm$^2$ or more should be sufficient to cure the photosensitive resin layer; it is obvious, however, light rays of an intensity higher than that may be applied depending on the type of photosensitive resin layer. The same heating furnace, hot plate, or other heating device as that used for the pre-baking may be used to carry out post-baking to heat the photosensitive resin layer 103 on the glass substrate at, for example, approximately 240 degrees Celsius for 1 minute or longer so as to fire the photosensitive resin layer 103 on the glass substrate.

Lastly, a film of aluminum, for example, is formed on the surface of the photosensitive resin layer 103 by electron beam deposition or the like to form the reflection film 105 along the surface of the pits to complete the reflector 101 of the embodiment.

Figure 13:
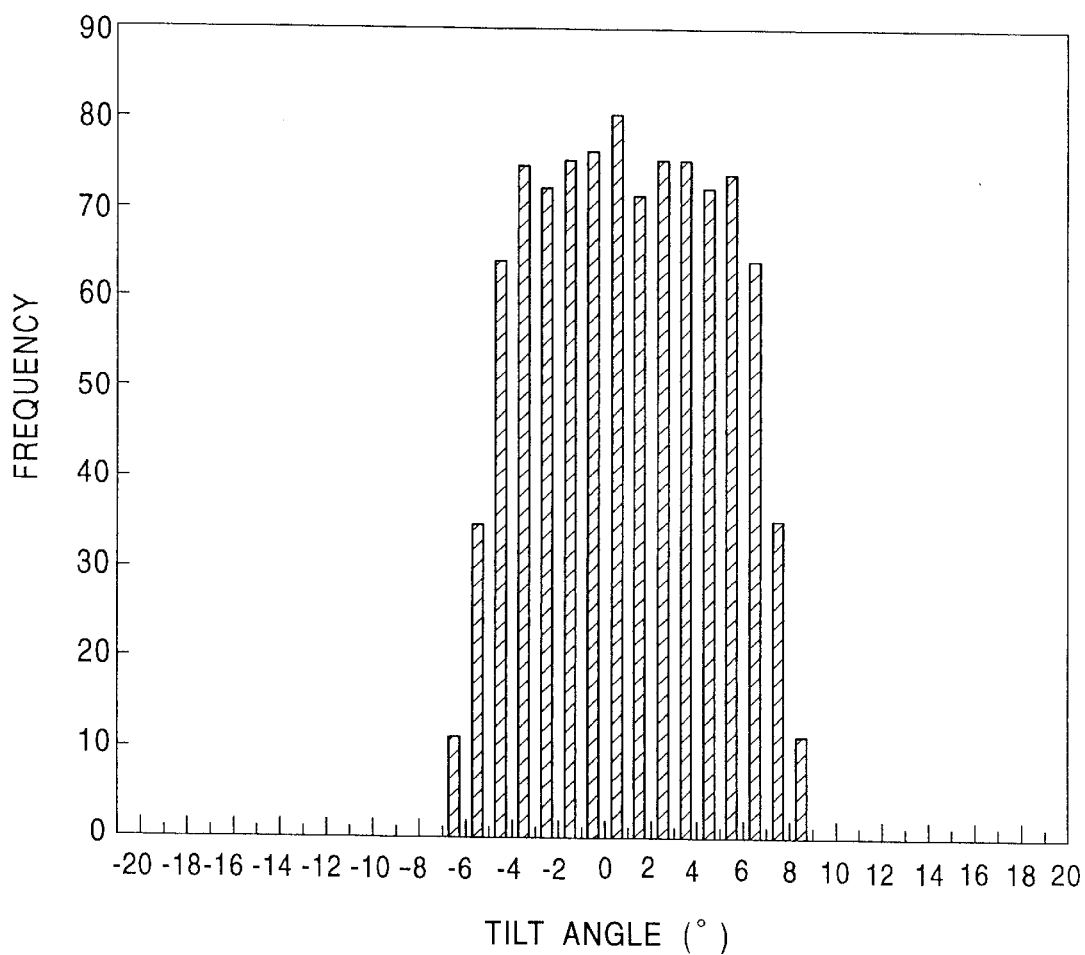
FIG. 13 is a diagram illustrates the distribution of the tilt angles of the inner surfaces of the pits in the reflector shown in FIG. 9.

In this reflector 101, many pits 104, each of which has its inner surface shaped like a partial sphere, are formed on the surface thereof, and the values including the depths of the pits 104 and the pitches between the adjacent pits 104 are set within the ranges defined above; hence, the distribution of the tilt angles of the inner surfaces of the pits shows a certain pattern in a fixed angle range. FIG. 13 shows the actual measurements of the distributed tilt angles of the inner surfaces of the pits in the reflector 101; the axis of abscissa indicates the tilt angle, while the axis of ordinate indicates the frequency of the existence of the tilt angles. As illustrated in the chart, the tilt angles exhibit a nearly fixed distribution pattern in the range of −8 degrees to +8 degrees, especially in the range of −4 degrees to +5 degrees. Furthermore, the inner surfaces of the pits 104 are spherical and symmetrical in all directions; hence, the fixed distribution pattern of the tilt angles can be implemented in all directions rather than in any particular direction.

The tilt angles of the inner surfaces of the pits are considered to govern the reflection angle of light reflected on the inner surfaces of the pits. In the case of this embodiment, since the fixed distribution pattern of tilt angles is implemented in all directions of the reflector, uniform angle of refection and reflection efficiency can be obtained in all directions, enabling light of various wavelengths to be reflected in good balance. In other words, the reflector in accordance with the embodiment is capable of providing a higher level of brightness and whiteness than those of the conventional reflectors regardless of the direction from which a user observes.

The foregoing matrix for forming the reflector can be fabricated simply by moving the diamond indenting tool 108 vertically to press the surface of the matrix base material 107; therefore, the diamond indenting tool 108 and the matrix base material 107 do not rub each other. As a result, the surface configuration of the diamond indenting tool 108 is accurately transferred to the matrix 109. If the distal end of the indenting tool 108 is provided with a mirror surface, then the inner surfaces of the pits of the matrix 109 and the inner surfaces of the pits of the reflector accordingly can be easily provided with mirror surfaces.

Obviously, the specific values such as the depths, diameters, and pitches of the pits 104 of the reflector 101 and the rolling pattern of the pits shown in FIG. 11 are just examples and they may be changed as necessary. Furthermore, the materials for the reflector base material, the matrix base material, the transfer mold, etc. may also be changed as necessary.

A super twisted nematic (STN) reflection type liquid crystal display device equipped with the foregoing reflector will now be described.

Figure 14:
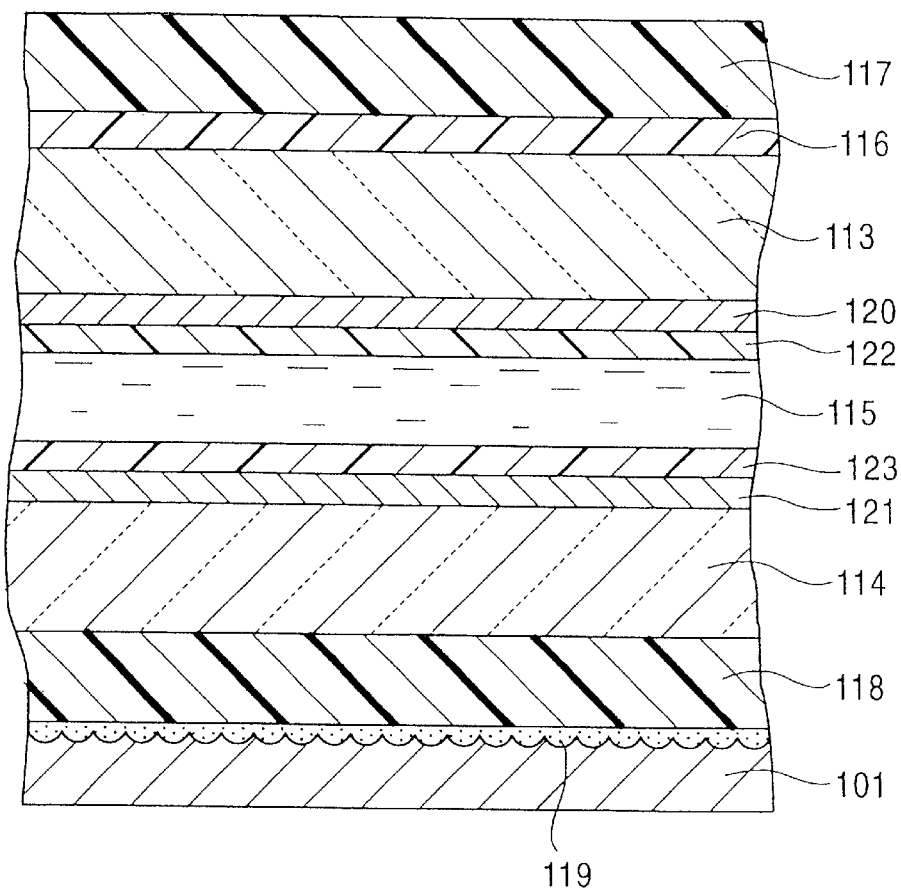
FIG. 14 is a sectional view showing a reflection type liquid crystal display device that is another embodiment of the present invention.

As shown in FIG. 14, in this reflection type liquid crystal display device, a liquid crystal layer 115 is provided between a pair of a glass substrate 113 on the display side and a glass substrate 114 on the rear surface side, each being, for example, 0.7 mm thick. A phase difference plate 116 composed of polycarbonate resin, polyarylate resin, or the like is provided on the top surface of the glass substrate 113 on the display side, and a first polarizing plate 117 is provided on the top surface of the phase difference plate 116. Further, a second polarizing plate 118 and the reflector 101 which is shown in FIG. 9 and which has been fabricated in advance according to the foregoing method are provided in the order in which they are listed, on the bottom surface of the glass substrate 114 on the rear surface side.

The reflector 101 is installed so that the surface thereof having the pits 104 is opposed to the bottom surface of the second polarizing plate 118. The gap between the second polarizing plate 118 and the reflector 101 is filled with a viscous member 119 made of a material such as glycerin that does not adversely affect the refractive index of light.

Transparent electrode layers 120 and 121 composed of indium tin oxide (ITO) or the like are formed on the opposed surfaces of the two glass substrates 113 and 114, respectively. Further, oriented films 122 and 123 composed of polyimide resin or the like are provided on the transparent electrode layers 120 and 121, respectively. The liquid crystal in the liquid crystal layer 115 is twisted 240 degrees due to the relationship mainly between the oriented films 122 and 123.

A color filter, not shown, may be formed by printing or the like between the glass substrate 114 on the rear surface side and the transparent electrode layer 121 so that the liquid crystal display device provides color display.

As explained above, in the liquid crystal display device in accordance with the embodiment, the reflector 101 itself features wider reflection angles of the incident light and higher reflection efficiency in all directions. Accordingly, the liquid crystal display device is able to provide a wider range of visual field angles and a higher level of brightness than those in the conventional liquid crystal display devices regardless of the direction from which the user observes the display surface.

In the reflection type liquid crystal display device of the embodiment, the description has been given to the example of the external type reflector which is disposed on the outer side of the second polarizing plate; however, the reflector may be the built-in type where it is attached to the opposed surface of the glass substrate on the rear surface side. Further, the description has been given to the STN type as the example of the liquid crystal display device; however, the reflector in accordance with the present invention can obviously be applied also to a twisted nematic (TN) type liquid crystal display device in which the twist angle of the liquid crystal molecules of the liquid crystal layer has been set to 90 degrees.

Thus, in the reflector according to the present invention, many pits having the inner surfaces shaped as partial spheres are formed on a surface thereof, and the depths of the pits, the pitches between adjoining pits, etc. are specified. By so doing, the tilt angles of the inner surfaces of the pits show a substantially fixed distribution pattern in a certain range of angles. Hence, the reflector is able to provide uniform reflection efficiency in all directions so as to enable light having diverse wavelengths to be reflected in good balance. This makes it possible to realize a reflector that provides a higher level of brightness and whiteness than that of the conventional reflectors regardless of the direction from which it is observed. Further, the reflection type liquid crystal display device in accordance with the present invention is equipped with the reflector having the outstanding characteristics as described above, thus making it possible to implement a liquid crystal display device having a brighter display screen with a wider range of visual field angles.

What is claimed is:

1. A molded reflector comprising a plurality of pits formed in succession on a surface thereof, inner surfaces of said pits having a curvature substantially defined by a radius of an indenting tool: wherein said pits are formed to have depths ranging from 0.1 $\mu$m to 3 $\mu$m at random; adjacent pits are disposed at random at pitches ranging from 5 $\mu$m to 50 $\mu$m; and tilt angles of the inner surfaces of said pits are set to predetermined angles.

2. A molded reflector according to claim 1, wherein the depths of said pits range from 0.6 $\mu$m to 1.2 $\mu$m, the tilt angles of the inner surfaces of said pits are distributed in the range of −8 degrees to +8 degrees, and the pitches between adjacent pits range from 26.5 $\mu$m to 33.5 $\mu$m.

3. The molded reflector of claim 1, the inner surfaces of the pits having a substantially partial spherical shape.

4. The molded reflector of claim 3, the depths of the pits ranging from 0.6 $\mu$m to 1.2 $\mu$m, the tilt angles of the inner surfaces of the pits ranging from −18 degrees to +18 degrees, and the pitches between adjacent pits ranging from 5 $\mu$m to 50 $\mu$m.

5. A reflection type liquid crystal display comprising a molded reflector having a plurality of pits formed in succession on a surface thereof, inner surfaces of said pits having a curvature substantially defined by a radius of an indenting tool: wherein said pits are formed to have depths ranging from 0.1 $\mu$m to 3 $\mu$m at random; adjacent pits are disposed at random at pitches ranging from 5 $\mu$m to 50 $\mu$m; and tilt angles of the inner surfaces of said pits are set to predetermined angles.

6. A reflection type liquid crystal display device according to claim 5, wherein: the depths of said pits range from 0.6 $\mu$m to 1.2 $\mu$m; the tilt angles of the inner surfaces of said pits are distributed in the range of −8 degrees to +8 degrees; and the pitches between adjacent pits range from 26.5 $\mu$m to 33.5 $\mu$m.

7. The reflection type liquid crystal display of claim 5, the inner surface of the pits having a substantially partial spherical shape.

8. The reflection type liquid crystal display of claim 7, the depths of the pits ranging from 0.6 $\mu$m to 1.2 $\mu$m, the tilt angles of the inner surfaces of the pits ranging from −18 degrees to +18 degrees, and the pitches between adjacent pits ranging from 5 $\mu$m to 50 $\mu$m.

* * * * *